US012065328B2

(12) United States Patent
Engleman

(10) Patent No.: US 12,065,328 B2
(45) Date of Patent: Aug. 20, 2024

(54) SYSTEMS, METHODS, AND DEVICES FOR SPLICING SHEET MATERIALS

(71) Applicant: Packsize LLC, Salt Lake City, UT (US)

(72) Inventor: Clinton Engleman, Layton, UT (US)

(73) Assignee: PACKSIZE LLC, Salt Lake City, UT (US)

( * ) Notice: Subject to any disclaimer, the term of this patent is extended or adjusted under 35 U.S.C. 154(b) by 657 days.

(21) Appl. No.: 16/984,930

(22) Filed: Aug. 4, 2020

(65) Prior Publication Data

US 2021/0039913 A1 Feb. 11, 2021

Related U.S. Application Data

(60) Provisional application No. 62/884,579, filed on Aug. 8, 2019.

(51) Int. Cl.

| | |
|---|---|
| ***B65H 37/04*** | (2006.01) |
| ***B31F 5/02*** | (2006.01) |
| ***B31F 5/06*** | (2006.01) |
| ***B65H 21/00*** | (2006.01) |

(52) U.S. Cl.

CPC ............. *B65H 37/04* (2013.01); *B31F 5/025* (2013.01); *B31F 5/06* (2013.01); *B65H 21/00* (2013.01); *B65H 2701/1762* (2013.01); *B65H 2701/1944* (2013.01)

(58) Field of Classification Search

CPC ............................... B65H 37/04; B65H 21/00; B65H 2701/1762; B65H 2701/1944; B65H 35/08; B65H 2301/4637; B65H 2701/176; B31F 5/025; B31F 5/06; B26F 2001/4481; B26F 1/384; B26F 1/44; B26D 3/10; B31B 50/16; B31B 50/74; B31B 50/99

See application file for complete search history.

(56) References Cited

U.S. PATENT DOCUMENTS

| | | | | |
|---|---|---|---|---|
| 2,309,469 A | | 1/1943 | Marcuse | |
| 4,460,430 A | * | 7/1984 | Kissell | B65H 19/1863 242/552 |
| 4,566,922 A | * | 1/1986 | Martinez | B31F 1/2831 156/506 |
| 4,744,845 A | * | 5/1988 | Posey | B65H 21/00 156/583.1 |

(Continued)

OTHER PUBLICATIONS

International Search Report and Written Opinion received for PCT Patent Application No. PCT/US2020/045395, mailed on Dec. 14, 2020, 12 pages.

*Primary Examiner* — George R Koch
*Assistant Examiner* — Christopher C Caillouet
(74) *Attorney, Agent, or Firm* — Quarles & Brady LLP

(57) ABSTRACT

A system for splicing together multiple sheets of generally rigid material into a continuous sheet. The system includes a cart with a cutting mechanism and a sealing mechanism. The cutting mechanism is configured to cut a pattern of segments through the sheet materials that can be interlocked to form a seam. The interlocking segments may include asymmetrical features. The sealing mechanism can apply tape to the seal to secure it. The splicing system may be used while one of the multiple sheets of generally rigid material is concurrently in use by a packaging machine without interruption to the packaging machine.

19 Claims, 11 Drawing Sheets

(56) References Cited

U.S. PATENT DOCUMENTS

| | | | | |
|---|---|---|---|---|
| 5,092,573 | A * | 3/1992 | Abreu | B65H 21/00 270/52.08 |
| 2007/0068618 | A1 | 3/2007 | Buchanan | |
| 2017/0361560 | A1 | 12/2017 | Osterhout | |

* cited by examiner

SYSTEMS, METHODS, AND DEVICES FOR SPLICING SHEET MATERIALS

CROSS-REFERENCE TO RELATED APPLICATION

The present application claims priority to and the benefit of U.S. Provisional Application No. 62/884,579, filed Aug. 8, 2019, and entitled Systems, Methods, and Devices for Splicing Sheet Materials, the entire content of which is incorporated herein by reference.

BACKGROUND

1. Technical Field

Exemplary embodiments of the present disclosure relate to systems, methods, and devices for splicing sheet materials together. More specifically, exemplary embodiments relate to sheet material splicing mechanisms that join sheet materials to be subsequently fed into a packaging machine used to create packaging templates from the joined sheet materials without an interruption to production.

2. The Relevant Technology

Shipping and packaging industries frequently use paperboard and other sheet material processing equipment that convert sheet materials into box templates. One advantage of such equipment is that a shipper may prepare boxes of required sizes as needed in lieu of keeping a stock of standard, pre-made boxes of various sizes. Consequently, the shipper can eliminate the need to forecast its requirements for particular box sizes as well as to store pre-made boxes of standard sizes. Instead, the shipper may store one or more bales of fanfold material, which can be used to generate a variety of box sizes based on the specific box size requirements at the time of each shipment. This allows the shipper to reduce storage space normally required for periodically used shipping supplies as well as reduce the waste and costs associated with the inherently inaccurate process of forecasting box size requirements, as the items shipped and their respective dimensions vary from time to time.

Available equipment for sheet material processing varies in scope, but often includes at least a converting machine that cuts, scores, and/or creases sheet material to form a box template. Once the template is formed, a manufacturer's joint is created in the template. A manufacturer's joint is where two opposing ends of the template are attached to one another. This can be accomplished manually and/or with additional machinery. For instance, an operator and/or a machine can apply glue to one end of the template and can fold the template to join the opposing ends together with the glue therebetween. Once the manufacturer's joint is created, the template can be partially erected and bottom flaps of the template can be folded and secured to form a bottom surface of a box. Thereafter, the to-be-packaged item(s) are transferred into the box and the top flaps are folded and secured. Again, each of these steps can be achieved by an operator or in an automated or semi-automated process involving additional machinery.

While some efforts have been made to create efficient packaging machines and processes that create packaging templates and erect and seal the packaging template around the to-be-packaged item(s), there remains room for improvement in the area of packaging machines and related methods. For instance, when the end of a bale of fanfold sheet material is reached, a new bale must be engaged with the packaging machine. This can inherently cause a disruption in production as the machine needs to be shut down while an operator installs a new bale of fanfold material.

Thus, there remains a need to create a more efficient process for feeding sheet materials into packaging machines such that the downtime of the packaging machines during the transition from one bale of sheet material to another is reduced or eliminated.

BRIEF SUMMARY

Exemplary embodiments of the disclosure relate to systems, methods, and devices for splicing together multiple sheets of generally rigid material to form a continuous sheet of material. More specifically, exemplary embodiments relate to systems, methods and devices that enable multiple bales of sheet material to be spliced together prior to or while one of the bales of sheet material is in use by a packaging machine to make box templates or complete packages without interrupting production.

For instance, one embodiment of a splicing system comprises a (movable) cart with at least one reference wall and a squaring arm for securing and/or aligning multiple sheets of generally rigid material onto an upper surface of the cart. The cart also includes a cutting mechanism configured to cut a pattern of interlocking segments through the sheets of material and a sealing mechanism configure to secure the spliced sheets together with tape, glue, or similar means.

In some embodiments, the cutting mechanism comprises a roller die cutter configured to cut a pattern of interlocking segments through multiple sheets of generally rigid material.

In some embodiments, the pattern of interlocking segments comprises segments that are positioned asymmetrically about an axis parallel to the width of the sheet materials that are to be spliced together.

In some embodiments, the sealing mechanism comprises a taping mechanism with a tape press and a retractable base plate configured to apply pressure to strips of tape positioned on one or more opposing surfaces of a seam formed by splicing the sheets of generally rigid material together, the retractable base plate being configured to hold a strip of tape below the sheets of material prior to actuation of the taping mechanism.

One example embodiment includes a method of splicing sheets of generally rigid material into a continuous length of sheet material. The method includes aligning and partially overlapping a first sheet of generally rigid material with a second sheet of generally rigid material. The method also includes cutting a pattern of interlocking segments through the first and second sheets and along an axis spanning between opposing sides of the first and second sheets. Additionally, the method includes removing an excess portion of material from the first and second sheets, such that the interlocking segments of each sheet are exposed. Further, the method includes connecting the exposed interlocking segments of the first sheet to the exposed interlocking segments of the second sheet to create a seam and securing the seam such that the interlocking segments remain connected.

In some embodiments, cutting a pattern of interlocking segments comprises cutting a pattern of interlocking segments that are asymmetrical about the axis such that the interlocking segments are staggered with respect to the axis.

In some embodiments, aligning and overlapping the first sheet of generally rigid material with the second sheet of generally rigid material comprises securing the first and second sheets in a lateral direction to prevent them from shifting out of alignment.

In some embodiments, securing the first and second sheets in a lateral direction comprises pressing corresponding sides of the first and second sheet against a reference wall or an adjustable guide arm.

In some embodiments, cutting a pattern of interlocking segments through the first and second sheets comprises cutting the pattern of interlocking segments through the first and second sheets at the same time using the same cutting mechanism.

According to another example embodiment, a splicing system for joining sheets of generally rigid material into a continuous length of sheet material includes a movable cart having a top surface. A reference wall is mounted on or adjacent to the top surface of the cart and is configured to align the sheets with one another. A roller die cutter is configured to roll over the sheets to cut a pattern of segments through the sheets. The pattern of segments in the sheets are configured to be interlocked with one another to form a seam. A sealing mechanism is configured to press tape onto opposing sides of the seam to secure the interlocking segments of the sheets together.

In some embodiments, the segments are asymmetrical about one or more axes of the pattern of segments.

In some embodiments, the sealing mechanism comprises a taping press and a retractable base plate.

In some embodiments, the retractable base plate is configured to be selectively retracted below the top surface of the cart.

In some embodiments, the retractable base plate is selectively movable up to or above the top surface of the cart.

In some embodiments, the system also includes a second reference wall or an adjustable guide arm positioned opposite and substantially parallel to the reference wall.

According to one embodiment, a bale is formed of generally rigid material. The bale includes a first end of the generally rigid material, a second end of the generally rigid material, and a plurality of fanfolded layers of generally rigid material between the first end and the second end. At least one of first end or the second end comprises a pattern of segments between opposing sides of the generally rigid material.

In some embodiments, both the first end and the second end comprise a pattern of segments between opposing sides of the generally rigid material.

In some embodiments, a set of bales are provided with the second end of a first bale of the set of bales comprising the pattern of segments and the first end of a second bale of the set of bales comprising the pattern of segments.

In some embodiments, the patterns of segments on the second end of the first bale and the first end of the second bale are configured to interlock with one another to connect together the second end of the first bale and the first end of the second bale.

These and other objects and features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The embodiments described herein generally relate to systems, methods, and devices for splicing together multiple sheets of generally rigid material to form a continuous sheet of material. More specifically, the described embodiments relate to systems, methods, and devices for splicing together bales of sheet material to be fed into packaging machines that in turn form packaging templates therefrom.

While the present disclosure will be described in detail with reference to specific configurations, the descriptions are illustrative and are not to be construed as limiting the scope of the present disclosure. Various modifications can be made to the illustrated configurations without departing from the spirit and scope of the invention as defined by the claims.

Throughout the description and claims, components are described as being in specific orientations or relative positions. Such descriptions are used merely for the sake of convenience and are not intended to limit the invention. For instance, a component may be described as being above or below another component. It will be appreciated, however, that the machines, system, and mechanisms may be oriented in other ways in some embodiments. As a result, a component that is described as being above another component may be positioned below or to the side of the other component in some embodiments. In some cases, a component that is described as being positioned "above" or "below" another component may be understood to be positioned on one side or another of sheet material that is being converted into packaging templates.

As used herein, the term "box template" refers to a substantially flat material that can be folded into a box-like shape. Box templates may be made from a stock of sheet material (e.g., paperboard, corrugated board, cardboard, etc.). In some cases, the sheet material is a fanfold material that has been folded back and forth on itself to form a bale. A box template may have notches, cutouts, divides, and/or creases that allow the box template to be bent and/or folded into a box. Additionally, a box template may be made of any suitable material, generally known to those skilled in the art. For example, cardboard or corrugated paperboard may be used as the box template material. A suitable material also may have any thickness and weight that would permit it to be bent and/or folded into a box-like shape.

Figure 1:
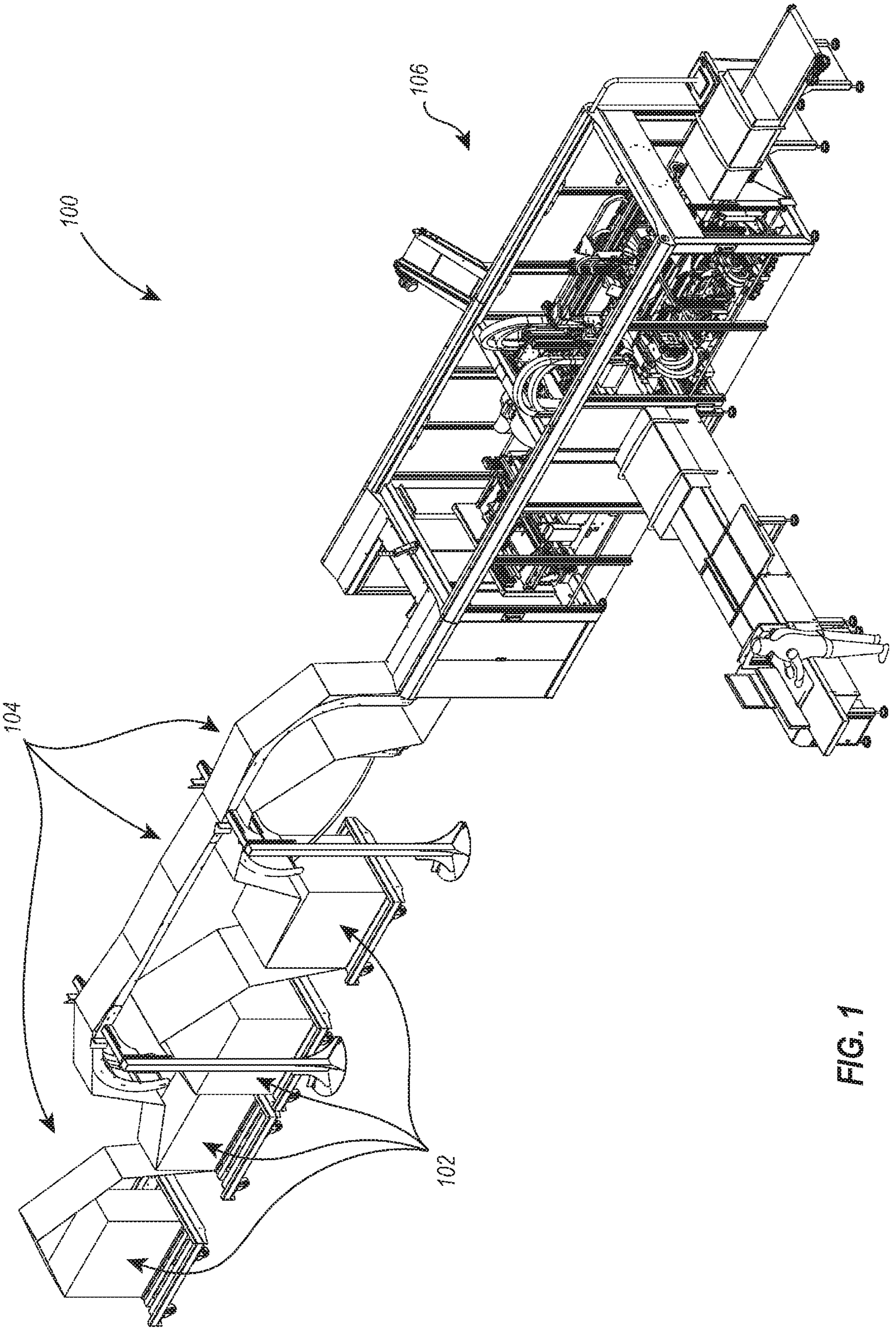
FIG. 1 illustrates an example packaging machine that uses bales of generally rigid sheet material to form box templates therefrom.

FIG. 1 illustrates one example of a packaging system 100 that uses bales 102 of generally rigid sheet material 104 to create and erect box templates around to-be-packaged items. In the illustrated system 100, items for packaging are delivered to a machine 106 to be packaged by the machine 106. Alternative machines are available that focus only on the creation of box templates using the same or similar materials as the packaging machine 106. Each of the provided examples use bales 102 of generally rigid sheet material 104 that can be fed into the machine 106 for operation. Generally rigid sheet materials 104 include but are not limited to cardboard, corrugated board, and paperboard.

When a bale 102 is exhausted, an operator replaces the bale 102 in order to continue operation. This action generally requires that the packaging machine 106 be shut down or operation thereof be suspended while the operator installs the new bale 102 of material 104. The systems, apparatuses, and methods disclosed herein enable an operator to splice together sheet materials 104 from multiple bales 10 to form a continuous sheet of material such that the packaging machine 106 is able to continue production without interruption. For instance, before the sheet material 104 in a first bale 102 is exhausted (and while the machine 106 is still drawing sheet material 104 therefrom), the trailing end of the sheet material 104 from the first bale 102 can be spliced together with the leading end of sheet material 104 from a new bale 102. Because the sheet materials 104 from the first and new bales 102 are spliced together, once the sheet material 104 from the first bale 102 is exhausted, the machine 106 will automatically start drawing sheet material 104 from the new bale 102 without having to halt operation of the machine 106.

Figure 2:
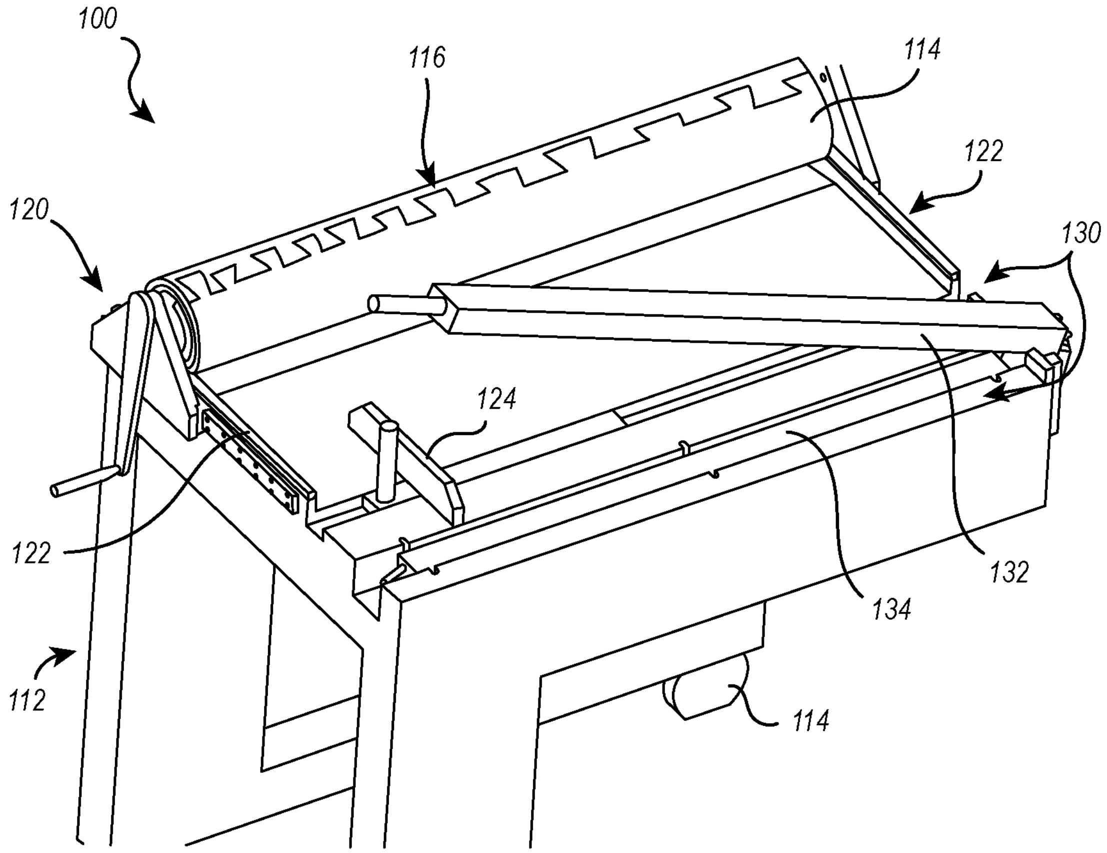
FIG. 2 illustrates an exemplary system for splicing together multiple sheets of generally rigid material into a continuous length of sheet material.

FIG. 2 illustrates an exemplary splicing system 110 that can be used to splice together the sheet materials 104 from multiple bales 102 together to form a continuous sheet between multiple bales. As a result, packaging machine 106 (see FIG. 1) can continue processing box templates without the interruption or stopping the machine 106 to load a new bale when the present bale of material is exhausted.

As shown, the splicing system 110 may include a cart 112. In some embodiments, the cart 112 may be movable. For instance, the cart 112 may be light enough to be carried by one or two individuals. In other embodiments, the cart 112 may include wheels 114 to enable the cart 112 to be rolled between desired locations.

The cart 112 also includes a cutting mechanism 114. In the illustrated embodiment, the cutting mechanism 114 is a roller die cutter that is configured to cut a pattern 116 of interlocking segments 118 (see FIG. 3) through each of the sheet materials 104 that are to be spliced together. The terms cutting mechanism 114 and roller die cutter 114 are used interchangeably herein. However, it will be appreciated that other types of cutting mechanisms may be used in place of or in addition to roller die cutters.

Also shown as part of the splicing system 110 is an actuation mechanism 120 for operating the cutting mechanism 114 (roller die cutter). The splicing system may also include one or more reference walls 122 for securing the sheet materials 104 while they are cut and subsequently joined. Furthermore, the splicing system 110 may also include an adjustable guide arm 124 that provides for varying widths of sheet materials 104 to be secured and/or aligned during the splicing process.

After the pattern 116 is cut into the sheet materials 104, the sheet materials 104 may be joined by the interlocking segments 118 of the pattern 116 to form a seam 126 (see FIG. 7) and subsequently sealed by a sealing mechanism 130 of the splicing system 110. In this example embodiment, the sealing mechanism 130 comprises a taping press 132 and a retractable base plate 134 for taping the seam 126 formed between the sheet materials 104. Other embodiments may employ glue or any other means for sealing the seam 126 between the sheet materials 104.

In the embodiment shown, and as discussed in greater detail below, a strip of tape may be applied across one or both faces of the seam 126. The retractable base plate 134 may be configured to move upward when the taping press 132 is actuated in order to apply pressure to the tape and the sheet materials 104 in order to ensure the tape is securely attached to the sheet materials 104.

Figure 3:
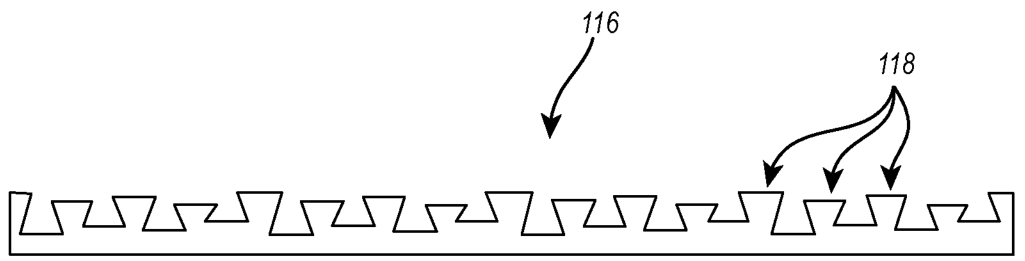
FIG. 3 illustrates an exemplary pattern of interlocking segments that may be used to splice together multiple sheets of generally rigid material into a continuous length of sheet material.

FIG. 3 illustrates a plan view of an exemplary pattern 116 of interlocking segments 118 that may be cut through the sheet materials 104 that are to be spliced together. The illustrated pattern 116 includes interlocking segments 118 that are of varying and/or alternating heights and/or widths such that the resulting pattern is asymmetric about one or more axes of the pattern 116. Such a pattern can provide various benefits. For instance, after the pattern 116 has been cut through at least two sheets of material 104 (e.g., the trailing end of one sheet 104 and on the leading end of another sheet 104), the asymmetric pattern 116 can help ensure that the interlocking segments 118 on the trailing end of one sheet 104 and on the leading end of another sheet 104 are properly joined or mated together. Additionally, the asymmetrical nature of the pattern 116 can increase the strength of the resulting seam 126.

Figure 4A:
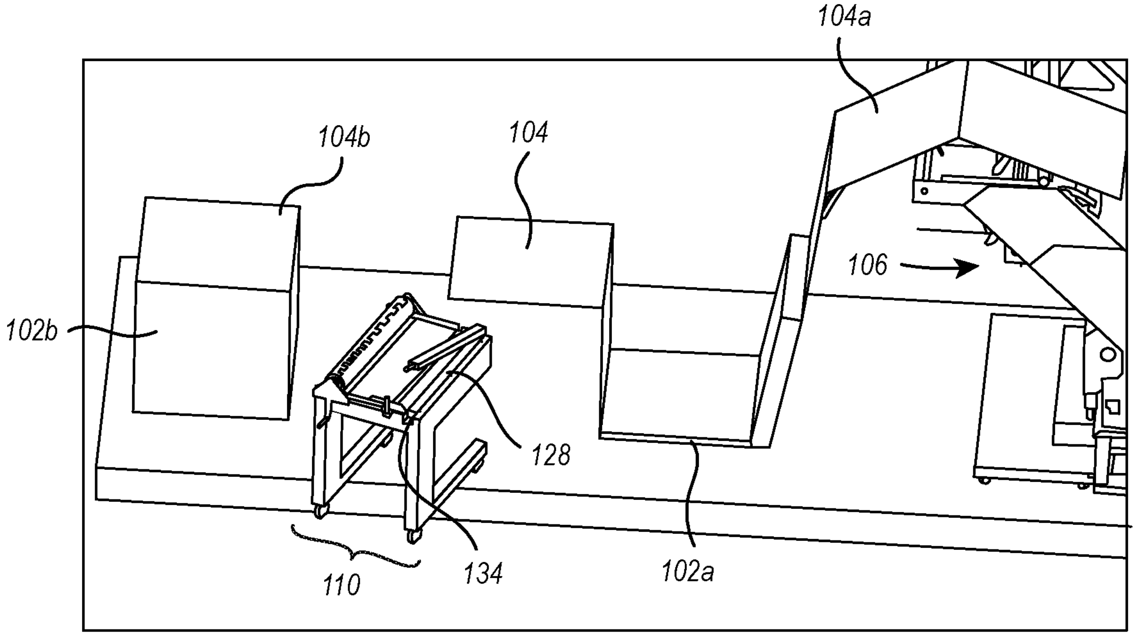
FIG. 4*a* illustrates the splicing system of FIG. 2 ready for use with a packaging machine similar to that shown in FIG. 1.

FIGS. 4*a* through 4*f* illustrate the exemplary splicing system 110 at successive steps in an exemplary splicing process. FIG. 4*a* shows the splicing system 110 in close proximity to a first bale 102*a* of generally rigid sheet material 104*a* that is being fed into a packaging machine 106 to be processed into box templates. In this example, a second bale 102*b* (formed of sheet material 104*b*) will be spliced with the first bale 102*a* to form a continuous sheet of material 104 without interrupting the operation of the packaging machine 106. In some embodiments, prior to loading the sheet materials 104*a*, 104*b* onto the splicing system 110, a first strip of tape 128 is placed across the retractable base plate 134 with the adhesive side of the tape 128 facing upward.

Figure 4B:
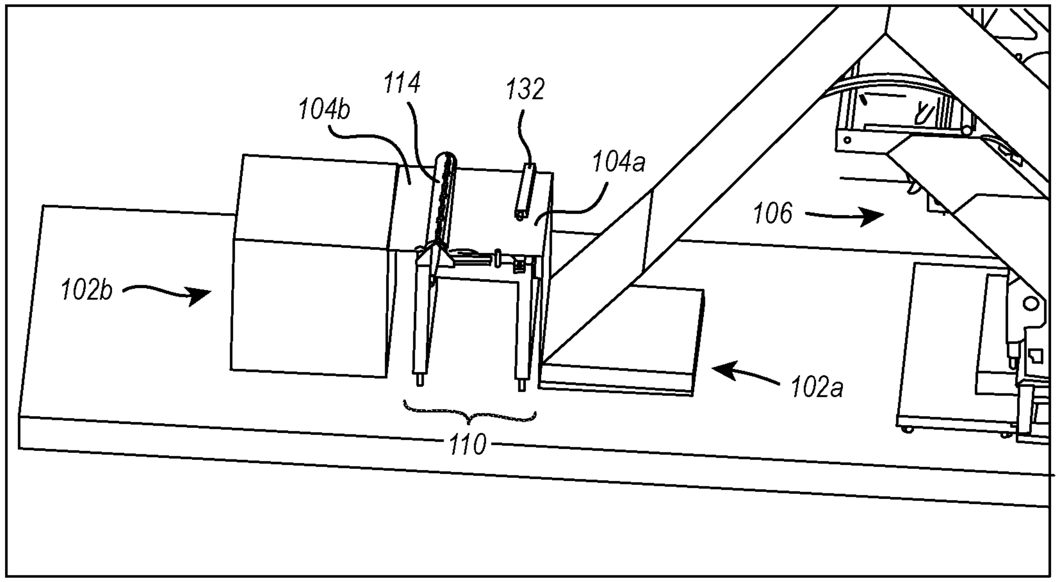
FIG. 4*b* illustrates the splicing system of FIG. 2 with two sheets of generally rigid material in position for cutting.

FIG. 4*b* shows the splicing system 110 in position with the sheet material 104*a*, 104*b* ready to be cut for splicing. A portion of sheet material 104*a* from the trailing end of the first bale 102*a* is stacked with a leading portion of sheet material 104*b* from the second bale 104*b* atop the splicing system 110 and underneath both the roller die cutter 114 and the taping press 132. The sheet materials 104*a*, 104*b* may then be cut using the roller die cutter 114 before proceeding to the next step in the splicing process.

In the illustrated embodiment, the trailing and leading ends, respectively, of the sheet materials 104*a*, 104*b* can be cut simultaneously by the roller die cutter 114. For instance, the trailing and leading ends, respectively, of the sheet materials 104*a*, 104*b* can be overlapped with one another and positioned below the roller die cutter 114 such that activation of the roller die cutter 114 cuts through the sheet materials 104*a*, 104*b* at the same time. Alternatively, the sheet materials 104*a*, 104*b* can be individually cut by the roller die cutter 114.

Figure 4C:
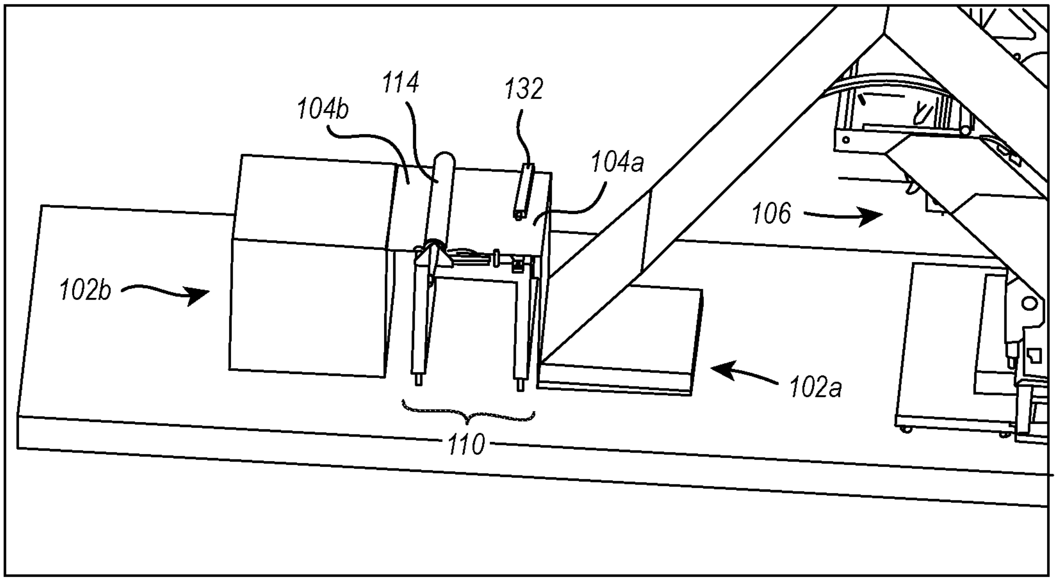
FIG. 4*c* illustrates the splicing system of FIG. 2 with the roller die cutter being operated to cut the two sheets of generally rigid material.

FIG. 4*c* shows the splicing system 110 with the roller die cutter 114 rotated so the cutting pattern 116 is oriented towards the sheet materials 104*a*, 104*b*. When the roller die cutter 114 is so rotated, the cutting pattern 116 is cut into the sheet materials 104*a*, 104*b* and excess material from the ends of the sheet materials 104*a*, 104*b* can be removed. The ends of the sheet materials 104*a*, 104*b* are left with mating patterns 116 cut therein. The mating patterns 116 can be joined together (e.g., by interlocking the mating segments 118) to form a continuous sheet of material 104.

Figure 4D:
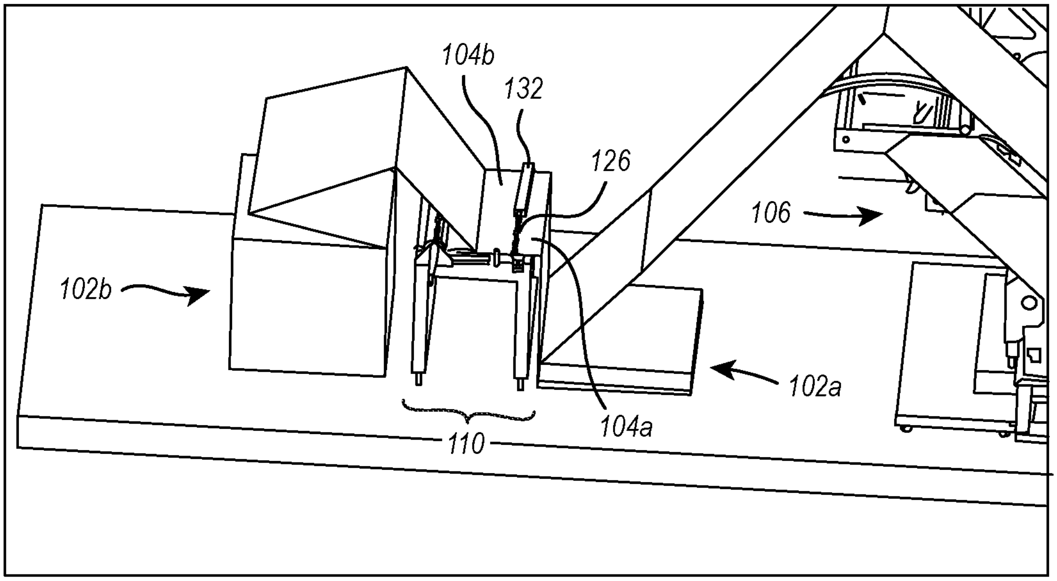
FIG. 4*d* illustrates the splicing system of FIG. 2 with the spliced sheets of generally rigid material in position for taping.

FIG. 4*d* shows the splicing system 110 after the sheet materials 104*a*, 104*b* of bales 102*a*, 102*b* have been cut and subsequently joined to form a seam 126 that is ready to be sealed by the sealing mechanism 130. The seam 126 may be positioned between the taping press 132 and the retractable base plate 134 to be sealed by applying tape 128 (see FIG. 4*a*) across the seam 126 on one side of the now continuous sheet of material 104.

Figure 4E:
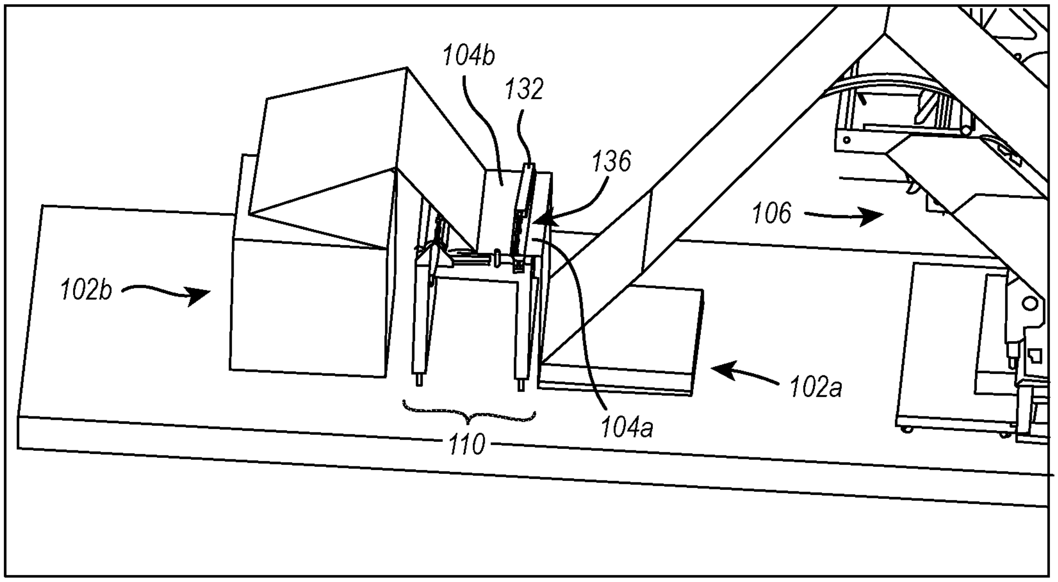
FIG. 4*e* illustrates the splicing system of FIG. 2 with tape positioned on the upper seam created by splicing two sheets of generally rigid material together.

FIG. 4*e* shows the splicing system 110 after an optional second strip of tape 136 has been applied across the seam 126 on an opposing side of the now continuous sheet of material 104.

Figure 4F:
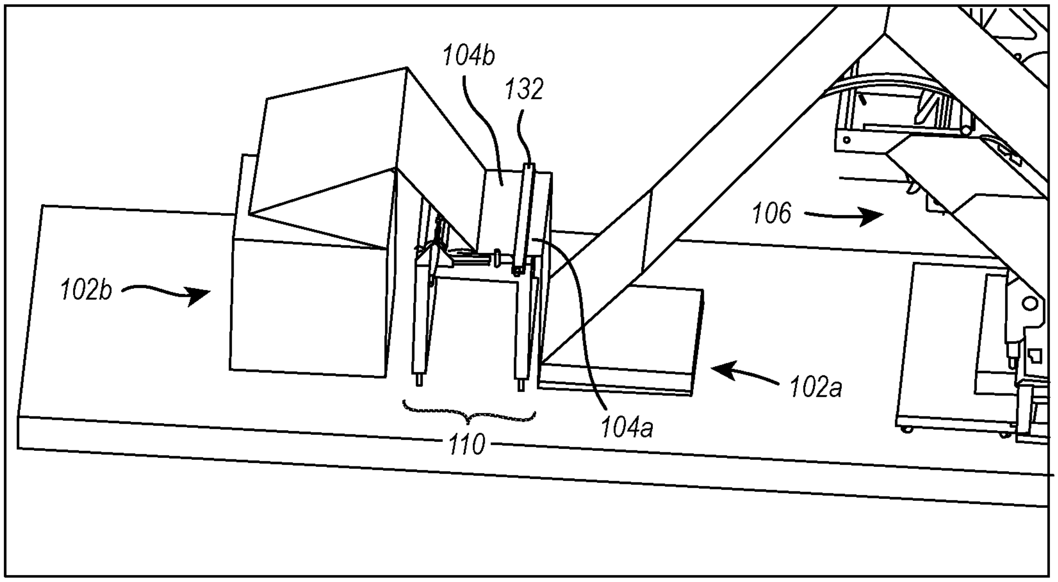
FIG. 4*f* illustrates the splicing system of FIG. 2 with pressure being applied to a spliced and taped seam.

FIG. 4*f* shows the splicing system 110 with the taping press 132 in operation to apply pressure to the tape 136 applied to the top side of the seam 126. In at least one embodiment, operation of the taping press 132 also causes the retractable base plate 134 to apply pressure upward in order to press the tape 128 onto both sides of the recently spliced sheet of material 104. As stated previously, each step in the splicing process may be accomplished without an interruption to the ongoing operation of packaging machine 106.

Figure 5A:
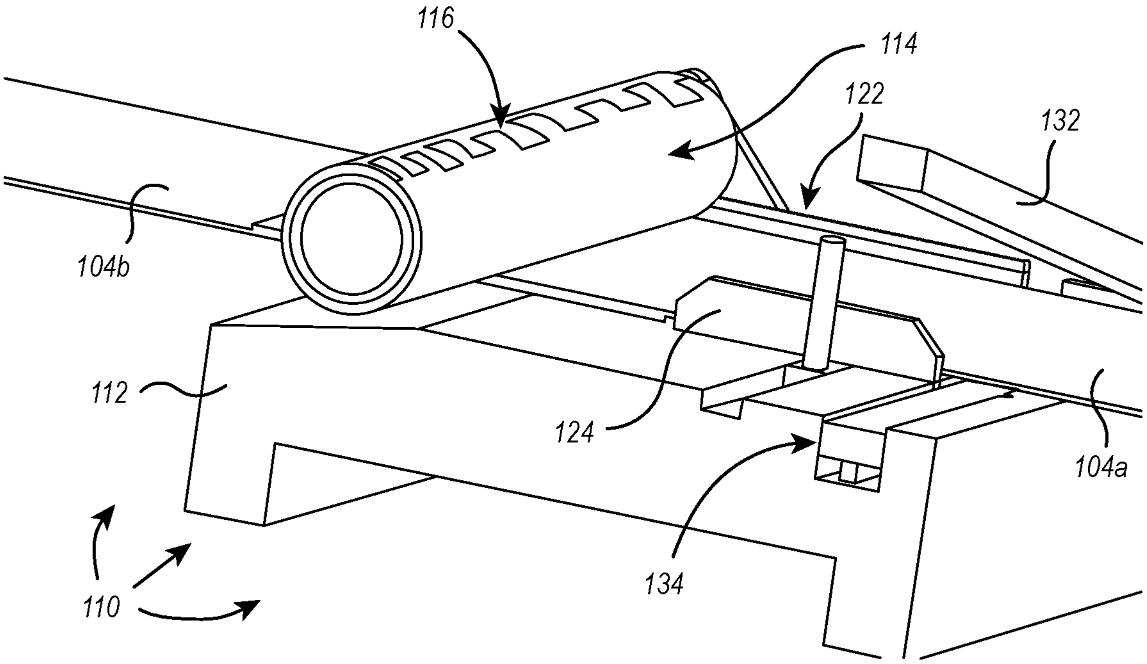
FIG. 5*a* illustrates a closeup view of an exemplary roller die cutter with two sheets of generally rigid material in place for cutting.
Figure 5B:
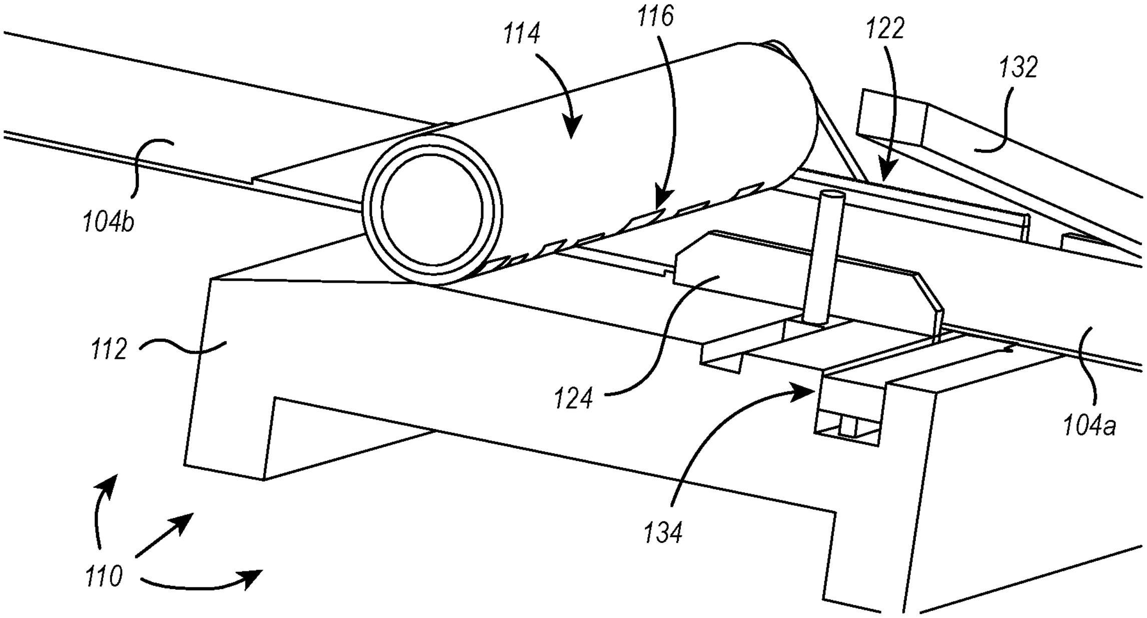
FIG. 5*b* illustrates a closeup view of the roller die cutter of FIG. 5*a* while in operation.

FIGS. 5*a* and 5*b* show closeup views of the roller die cutter 114 in operation to cut the pattern 116 of interlocking segments 118 through the sheet materials 104*a*, 104*b*. For ease of illustration, portions of the splicing system 110 have been cut away to show the mechanisms illustrated in greater detail.

As can be seen, the trailing end of sheet material 104*a* and the leading end of sheet material 104*b* have been inserted under the roller die butter 114 such that the sheet materials 104*a*, 104*b* overlap one another. Prior to operation, when roller die cutter is rotated so that pattern 116 is orientated away from the top of the cart 112 (as shown in FIG. 5*a*), there is sufficient space between the top surface of the cart 112 and the roller die cutter 114 to allow the sheet materials 104*a*, 104*b* to be between the roller die cutter 114 and the top surface of the cart 112.

In some embodiments, it may be important to properly align the sheet material 104*b* with the sheet material 104*a*. For instance, it may be important that the sheet material 104*b* is aligned with sheet material 104*a* so that sheet material 104*b* is feed into the packaging machine 106 is a desired direction. To help align the sheet materials 104*a*, 104*b*, the sheet materials 104*a*, 104*b* may be pressed against one or both references walls 122 and/or adjustable guide arm 124. The reference walls 122 and/or the adjustable squaring arm 124 may align the sheet materials 104*a*, 104*b* such that they are in line with one another or form a straight line. If the sheet materials 104*a*, 104*b* are not properly aligned with one another, the resulting spliced sheet material 104 may become jammed in the packaging machine 106.

For instance, with the sheet materials 104*a*, 104*b* inserted between the roller die cutter 114 and the top surface of the cart 112 and overlapping one another, corresponding sides of the sheet materials 104*a*, 104*b* can be pressed against one or both of the reference walls 122. If the sheet materials 104*a*, 104*b* are wide enough to span between both of the references walls 122, opposing sides of the sheet materials 104*a*, 104*b* can be guided in alignments by the reference walls 122.

In the event that the sheet materials 104*a*, 104*b* are not wide enough to contact both of the reference walls 122, corresponding sides of the sheet materials 104*a*, 104*b* can be pressed against one of the reference walls 122. Optionally, the adjustable guide arm 124 can be moved into engagement with the opposing sides of the sheet materials 104*a*, 104*b* to press the sheet materials 104*a*, 104*b* into engagement with one reference wall.

To facilitate proper alignment between the sheet materials 104*a*, 104*b*, the reference walls 122 and/or the adjustable guide arm 124 may have a length of 6 inches, 12 inches, 18 inches, 24 inches, or more. As will be appreciated, the longer the length of the reference walls 122 and/or the adjustable guide arm 124 (against which the sheet materials 104*a*, 104*b* may be pressed against), the more accurately the sheet materials 104*a*, 104*b* may be aligned with one another.

FIG. 5*b* shows the roller die cutter 114 during operation. In particular, the roller die cutter 114 is rotated so the pattern 116 is oriented towards the sheet materials 104*a*, 104*b*. When the roller die cutter 114 is so rotated, the pattern 116 is cut into the sheet materials 104*a*, 104*b*. When the pattern 116 is cut into the sheet materials 104*a*, 104*b*, excess material is cut off of the trailing end of sheet material 104*a* and the leading end of sheet material 104*b*. The remaining ends of the sheet materials 104*a*, 104*b* are left with the mating shape of the pattern 116.

Figure 5C:
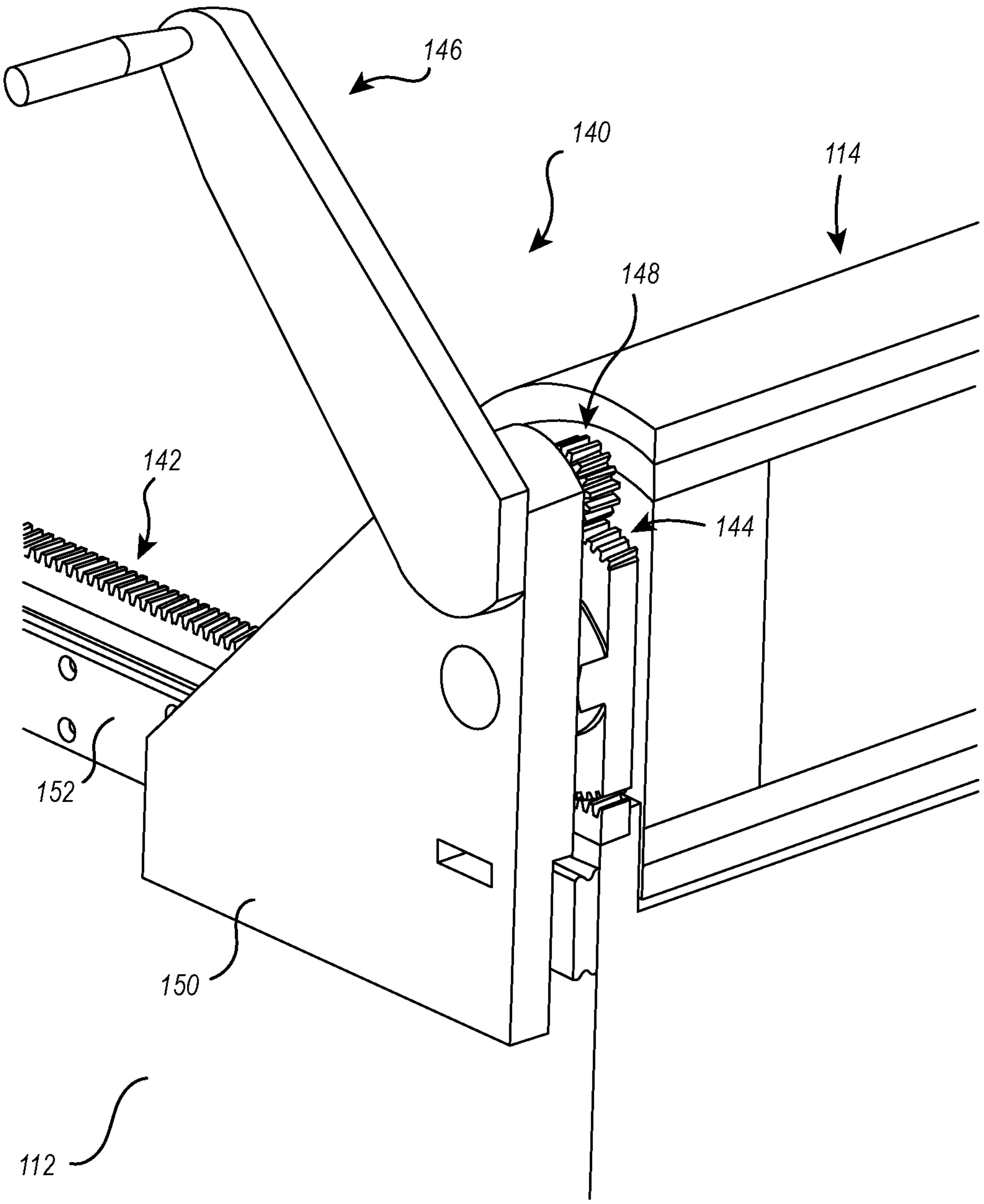
FIGS. 5*c* and 5*d* illustrate an example actuation mechanism of the roller die cutter of FIGS. 5*a* and 5*b*.
Figure 5D:
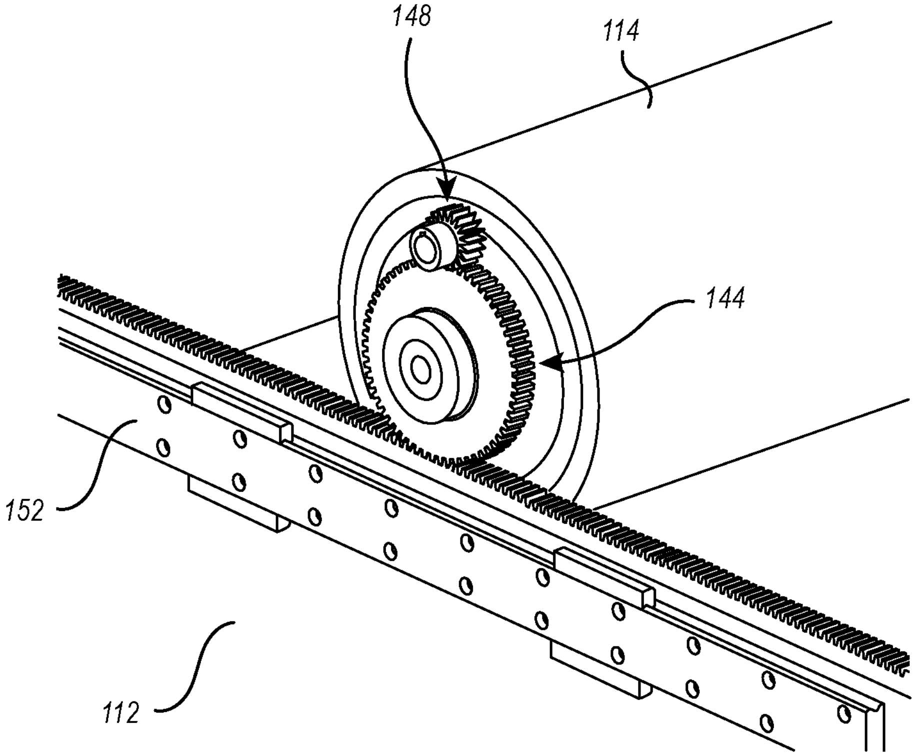

FIGS. 5*c* and 5*d* illustrate an actuation mechanism 140 for moving the roller die cutter 114 from the non-activated or non-cutting position shown in FIG. 5*a* to the activated or cutting position shown in FIG. 5*b*. As can be seen in FIGS. 5*c* and 5*d*, the actuation mechanism 140 includes a rack 142, a pinion 144, a rotatable handle 146 (not shown in FIG. 5*d*), and a gear 148. The rack 142 is mounted on the cart 112 and includes a line of gear teeth. The pinion 144 includes a plurality of gear teeth disposed around a circumferential surface. The teeth of the rack 142 and the teeth of the pinion 144 mate with one another and allow the pinion 144 to roll along the rack 142. The pinion 144 is mounted on the roller die cutter 114 such that rotation of the pinion 144 rotates the roller die cutter 114.

The rotatable handle 146 is rotatably connected to a slider 150 (not shown in FIG. 5*d*) such that the rotatable handle 146 can rotate relative to the slider 150. The slider 150 is slidably mounted on a track 152. The track 152 is mounted on the cart 112. The rotatable handle 146 is connected to the gear 148 such that rotation of the rotatable handle 146 rotates the gear 148. The gear 148 include gear teeth that mate with the gear teeth of the pinion 144.

In operation, the rotatable handle 146 may be rotated, which in turn rotates the gear 148. Rotation of the gear 148 causes the pinion 144 to rotate. Because the pinion 144 is mounted to the roller die cutter 114, rotation of the pinion 144 causes the roller die cuter 114 to also rotate (e.g., between the activated and non-activated positions). Additionally, rotation of the pinion 144 causes the pinion to move along the length of the rack 142. As the pinion 144 moves along the length of the rack 142, the slider 150 slides along the length of the track 152.

Once the ends of the sheet material 104*a*, 104*b* have bee cut with the roller die cutter 114 and the excess material removed, the ends of the sheet materials 104*a*, 104*b* can be joined together to form a seam 126. In particular, the mating segments 118 of the pattern 116 cut therein can be locked together. For instance, the male segments 118 of the pattern 116 in the sheet material 104*a* can be inserted into the corresponding female segments 118 of the pattern 116 in the sheet material 104*b*, and vice versa.

Figure 6A:
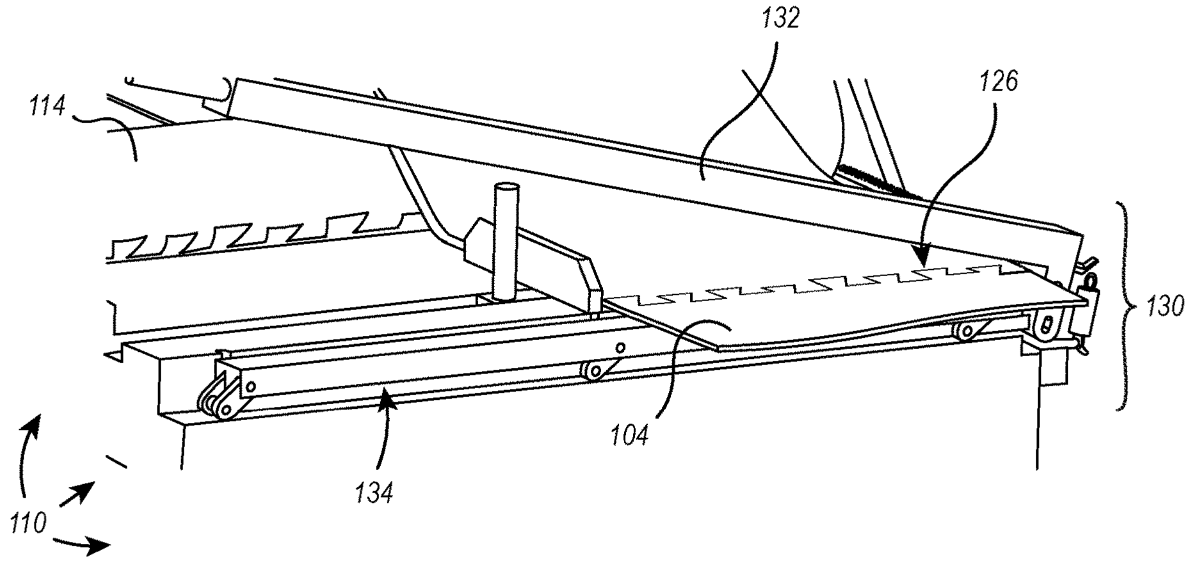
FIG. 6*a* illustrates a closeup view of an exemplary taping mechanism in an open configuration ready for use.
Figure 6B:
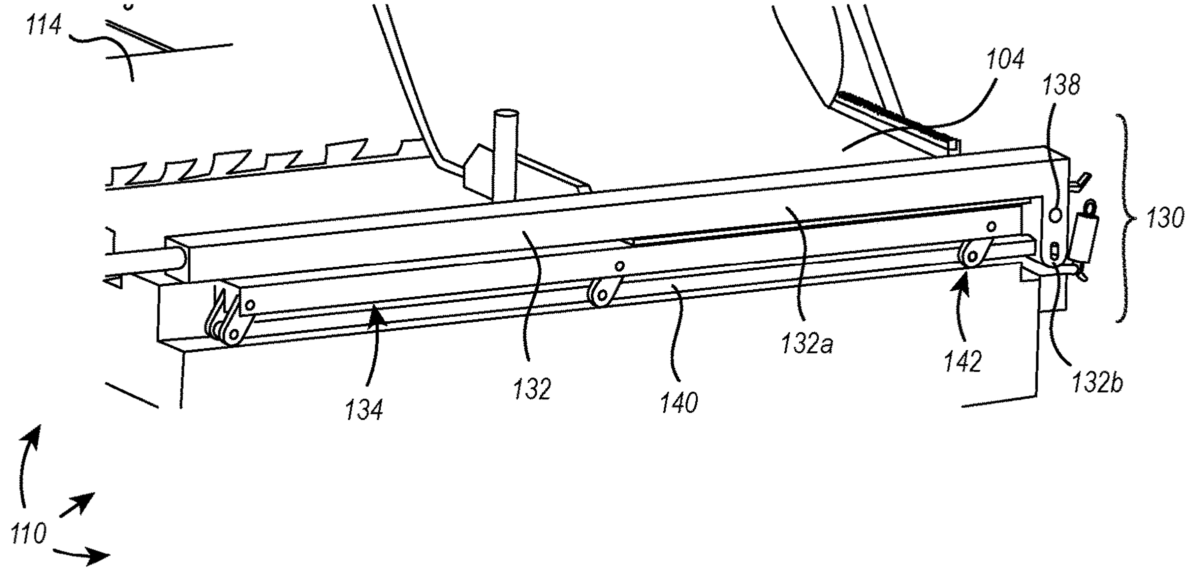
FIG. 6*b* illustrates a closeup view of the taping mechanism in FIG. 6*a* while in operation.

Once the sheet materials 104*a*, 104*b* are locked together, the sealing mechanism 130 can be used to apply tape across the interlocking segments 118 to the secure the seam 126. FIGS. 6*a* and 6*b* show closeup views of the sealing mechanism 130. FIG. 6*a* shows sealing mechanism 130 in an open position prior to operation and FIG. 6*b* shows the sealing mechanism 130 during operation. As illustrated, the sealing mechanism 130 includes the taping press 132 and the retractable base plate 134.

When the taping press 132 is in the open position, the retractable base plate 134 is positioned below top surface of the cart 112 and the sheet material 104. Because the retractable base plate 134 recessed below the top surface of the cart 112, the retractable base plate 134 does not come in contact with the sheet material 104 prior to operation of the taping press 132. As a result, a strip of tape 128 can be to be placed upon the retractable base plate 134 at the beginning of the splicing process (as shown in FIG. 4*a*), without coming into contact with the sheet material 104 until a desired time.

With the sealing mechanism 130 in the open position, the seam 126 formed between the sheet materials 104*a*, 104*b* can be positioned between the taping press 132 and the retractable base plate 134, as shown in FIGS. 4*d* and 6*a*. That is, the seam 126 can be position over the retractable base plate 134 and below the taping press 132.

Once the seam 126 is properly positioned, a piece of tape 136 can be applied across the seam 126 on the side of the sheet material 104 facing the taping press 132, as shown in FIG. 4*e*. The taping press 132 can then be moved from the open position shown in FIG. 6*a* to the closed position shown in FIG. 6*b*. Movement of the taping press 132 to the closed position causes the taping press 132 and the retractable base plate 134 to compress the tape 128, 136 onto opposing sides of the seam 126, thereby securing the same 126.

The taping press 132 and the retractable base plate 134 are interconnected such that movement of the taping press 132 from the open position to the closed position causes the retractable base plate 134 to be raised up. In some embodiments, the retractable base plate 134 can be raised up to or above the top surface of the cart 112. The upward movement of the retractable base plate 134 and the downward movement of the taping press 132 provides the compressive force that applies the tape 128, 126 to the seam 126.

In the illustrated embodiment, the taping press 132 is rotatably mounted on a pivot pin 138 and include a press arm 132*a* and a linkage arm 132*b*. The retractable base plate 134 is connected to a rod 140 via a plurality of pivot linkages 142. The rod 140 is connected to the linkage arm 132*b* such that rotation of the taping press 132 (including the press arm 132*a* and the linkage arm 132*b*) causes the rod to move. The movement of the rod 140 in turn causes the pivot linkages 142 to pivot. The pivoting movement of the pivot linkages 142 causes the retractable base plate 134 to move between the retracted position (FIG. 6*a*) and the raised position (FIG. 6*b*).

Figure 7:
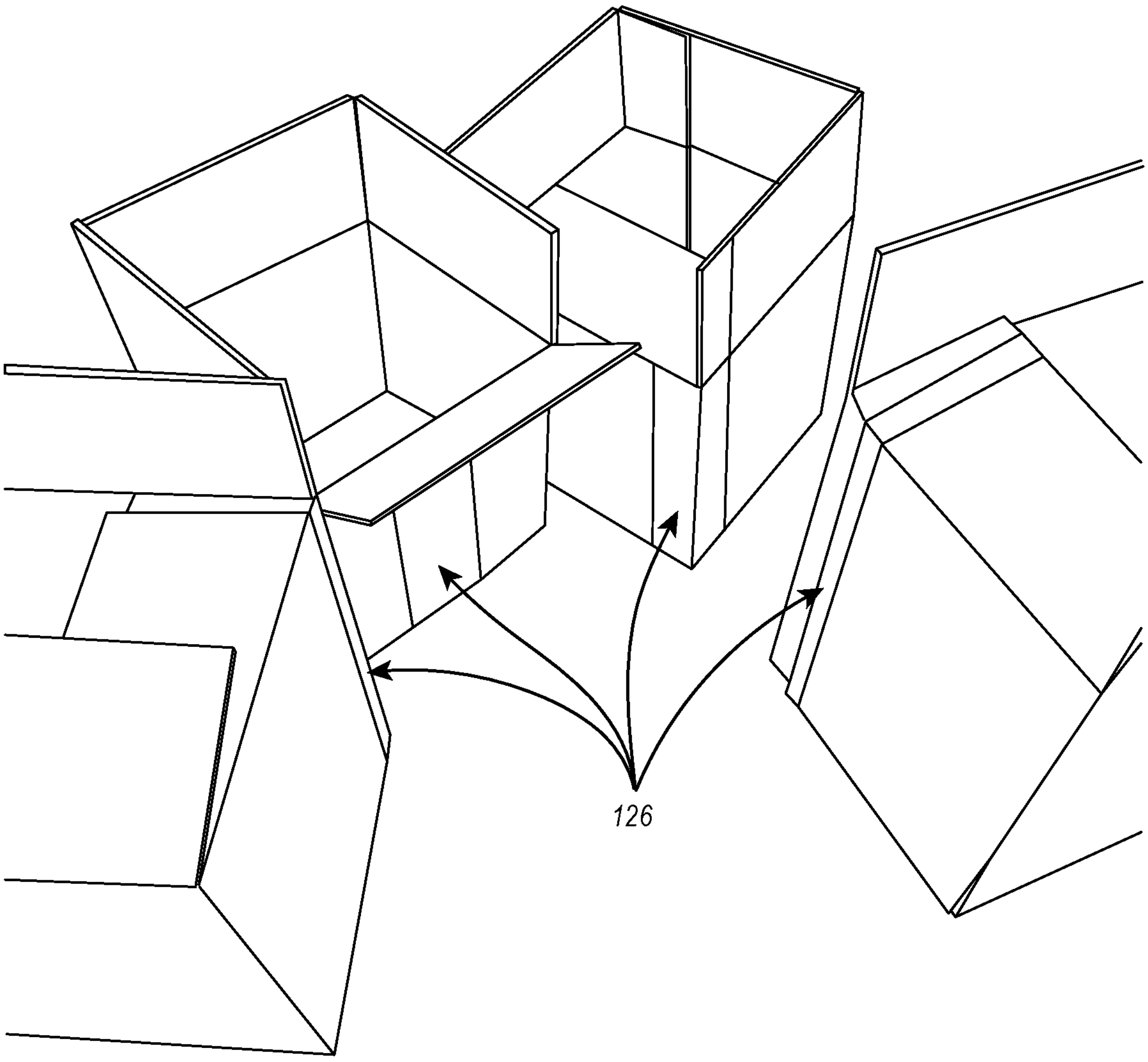
FIG. 7 illustrates multiple exemplary boxes formed by a packaging machine using sheet materials that have been spliced into a continuous sheet.

FIG. 7 shows several boxes produced using sheet materials 104 that have been spliced together and sealed according the exemplary process described in reference to FIGS. 4*a* to 4*f*. As shown, the seams 126 formed by the splicing process are sufficiently durable to allow for a box to be created with the seam 126 extending through a wall of the resulting box or even at a corner of the resulting box. Such durability may be achieved by use of the asymmetrical pattern 116 of interlocking segments 118 as discussed in relation to FIG. 3.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A splicing system for joining sheets of generally rigid material into a continuous length of sheet material, the splicing system comprising:
   - a support surface configured to support the sheets;
   - a reference wall extending upwardly from the support surface and configured to align the sheets with one another;
   - a cutting mechanism configured to cut a pattern of interlocking segments through the sheets between opposing sides of the sheets, the cutting mechanism being configured to move over the support surface and in a direction parallel to a length of the sheets when cutting the pattern of interlocking segments; and
   - a sealing mechanism configured to secure the interlocking segments of the sheets together, the sealing mechanism comprising a taping press and a retractable base plate, the retractable base plate having an upper surface that is selectively movable from a position below the support surface to a position aligned with or above the support surface.

2. The splicing system of claim 1, wherein the cutting mechanism comprises a rotary die cutter.

3. The splicing system of claim 1, wherein the interlocking segments are positioned asymmetrically about an axis extending between the opposing sides of the sheets such that the interlocking segments are staggered with respect to the axis.

4. The splicing system of claim 1, wherein the taping press and the retractable base plate are linked together such that movement of the taping press towards the support surfaces causes the retractable base plate to move from the position below the support surface to the position aligned with or above the support surface.

5. The splicing system of claim 1, wherein the retractable base plate and the taping press are configured to apply pressure to the sheets when the taping press is actuated.

6. The splicing system of claim 1, wherein the retractable base plate is configured to hold a strip of tape below and away from the sheets prior to actuation of the taping press.

7. The splicing system of claim 6, wherein the retractable base plate is movable into engagement with the sheets upon actuation of the taping press.

8. The splicing system of claim 1, further comprising an adjustable guide arm positioned opposite and substantially parallel to the reference wall, the adjustable guide arm being adjustable to allow for various widths of sheets to pass between the adjustable guide arm and the reference wall.

9. The splicing system of claim 1, wherein the reference wall, the cutting mechanism, and the sealing mechanism are mounted on a movable cart.

10. A splicing system for joining sheets of generally rigid material into a continuous length of sheet material, the splicing system comprising:

a movable cart having a top surface;

reference walls mounted on or adjacent to opposing sides of the top surface of the cart, at least one of the reference walls being configured to align the sheets with one another;

a roller die cutter configured to roll over the sheets to cut a pattern of segments through the sheets, the pattern of segments in the sheets being configured to be interlocked with one another to form a seam, the roller die cutter being movably mounted the on the reference walls such that the roller die cutter is configured to move along a length of the reference walls and in a direction generally parallel to the length of the sheets when cutting the pattern of segments in the sheets; and a sealing mechanism configured press tape onto opposing sides of the seam to secure the interlocking segments of the sheets together.

11. The splicing system of claim 10, wherein the segments are asymmetrical about one or more axes of the pattern of segments.

12. The splicing system of claim 10, wherein the sealing mechanism comprises a taping press and a retractable base plate.

13. The splicing system of claim 12, wherein the retractable base plate is configured to be selectively retracted below the top surface of the cart.

14. The splicing system of claim 13, wherein the retractable base plate is selectively movable up to or above the top surface of the cart.

15. The splicing system of claim 10, wherein the roller due cutter is mounted on the reference walls with a rack and pinion system.

16. A splicing system for joining sheets of generally rigid material into a continuous length of sheet material, the splicing system comprising:

support surface configured to support the sheets;

reference walls mounted on or adjacent to opposing sides of the top surface of the cart, at least one of the reference walls being configured to align the sheets with one another;

a roller die cutter configured to roll over the sheets to cut a pattern of segments through the sheets, the pattern of segments in the sheets being configured to be interlocked with one another to form a seam, the roller die cutter being movably mounted the on the reference walls such that the roller die cutter is configured to move along a length of the reference walls and in a direction generally parallel to the length of the sheets when cutting the pattern fo segments in the sheets;

a sealing mechanism configured to secure the interlocking segments of the sheets together, the sealing mechanism comprising a taping press and a retractable base plate, the retractable base plate having an upper surface that is selectively movable from a position below the support surface to a position aligned with or above the support surface.

17. The splicing system of claim 16, wherein the taping press and the retractable base plate are linked together such that movement of the taping press towards the support surfaces causes the retractable base plate to move from the position below the support surface to the position aligned with or above the support surface.

18. The splicing system of claim 16, wherein the retractable base plate and the taping press are configured to apply pressure to the sheets when the taping press is actuated.

19. The splicing system of claim 16, wherein the roller due cutter is mounted on the reference walls with a rack and pinion system.

* * * * *